(12) United States Patent
Lambino et al.

(10) Patent No.: US 6,725,384 B1
(45) Date of Patent: Apr. 20, 2004

(54) METHOD AND APPARATUS FOR ENABLING A WAKE-UP EVENT BY MODIFYING A SECOND REGISTER TO ENABLE A SECOND WAKE-UP EVENT RESPONSIVE TO DETECTING ENTRY OF DATA IN A FIRST REGISTER

(75) Inventors: John P. Lambino, Beaverton, OR (US); James H. Ewertz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 425 days.

(21) Appl. No.: 09/607,335

(22) Filed: Jun. 30, 2000

(51) Int. Cl.⁷ .............................. G06F 1/26; G06F 1/28; G06F 1/30
(52) U.S. Cl. ..................... 713/320; 713/300; 713/310; 713/322; 713/323; 713/324
(58) Field of Search .................. 713/300, 310, 713/320, 323, 324, 322, 330, 340

(56) References Cited

U.S. PATENT DOCUMENTS

| | | | |
|---|---|---|---|
| 6,055,643 A | | 4/2000 | Chaiken |
| 6,065,121 A | | 5/2000 | Hobson et al. |
| 6,115,813 A | * | 9/2000 | Hobson et al. ............... 713/1 |
| 6,122,748 A | | 9/2000 | Hobson ....................... 713/323 |
| 6,167,511 A | * | 12/2000 | Lewis ........................... 713/2 |
| 6,266,776 B1 | * | 7/2001 | Sakai .......................... 713/300 |
| 6,360,327 B1 | * | 3/2002 | Hobson ....................... 713/300 |

FOREIGN PATENT DOCUMENTS

| | | | |
|---|---|---|---|
| EP | 0 908 823 | 4/1999 | |
| EP | 0 973 086 | 1/2000 | |
| WO | WO 9844405 A1 * | 10/1998 | ............. G06F/1/32 |

OTHER PUBLICATIONS

Lu, Y.-H.; Simunic, T.; De Micheli, G.; "Software controlled power management", Hardware/Software Codesign, 1999. (CODES '99) Proceedings of the Seventh International Workshop on, 1999 Page(s)157–161.*

*Personal Computer Waking Up Scheme for ACPI Operating System*, Research Disclosure, Kenneth Mason Publicatios, Hampshire, GB, No. 416, Dec. 1998, p. 1685 XP000834147 ISSN: 0374–4353.

* cited by examiner

Primary Examiner—Thomas Lee
Assistant Examiner—James K. Trujillo
(74) Attorney, Agent, or Firm—Kenyon & Kenyon

(57) ABSTRACT

A method and apparatus provides hardware-configured wake-up events for a computer operating system compliant with an advanced configuration and power interface (ACPI) protocol without requiring additional hardware. The method and apparatus includes generation of a system management interrupt (SMI) during normal ACPI working-to-sleep transition allowing a basic input-output system (BIOS) circuit to enable additional wake-up events independent of the computer operating system.

15 Claims, 8 Drawing Sheets

PM1 EVENT REGISTERS

| REGISTER | SIZE (BYTES) | ADDRESS (RELATIVE TO REGISTER BLOCK) |
|---|---|---|
| ~PM1a_STS | PM1 EVT LEN/2 | <PM1a_EVT_BLK> |
| PM1a_EN | PM1 EVT LEN/2 | <PM1a_EVT_BLK>+PM1_EVT_LEN/2 |
| PM1b_STS | PM1 EVT LEN/2 | <PM1b_EVT_BLK> |
| PM1b_EN | PM1 EVT LEN/2 | <PM1b_EVT_BLK>+PM1_EVT_LEN/2 |

— 210

PM1 CONTROL REGISTERS

| REGISTER | SIZE (BYTES) | ADDRESS (RELATIVE TO REGISTER BLOCK) |
|---|---|---|
| PM1_CNTa | PM1_CNT_LEN | <PM1a_CNT_BLK> |
| PM1_CNTb | PM1_CNT_LEN | <PM1b_CNT_BLK> |

— 220

PM2 CONTROL REGISTERS

| REGISTER | SIZE (BYTES) | ADDRESS (RELATIVE TO REGISTER BLOCK) |
|---|---|---|
| PM2_CNT | PM2_CNT_LEN | <PM2_CNT_BLK> |

PM TIMER REGISTER

| REGISTER | SIZE (BYTES) | ADDRESS (RELATIVE TO REGISTER BLOCK) |
|---|---|---|
| PM_TMR | PM_TMR_LEN | <PM_TMR_BLK> |

PROCESSOR CONTROL REGISTERS

| REGISTER | SIZE (BYTES) | ADDRESS (RELATIVE TO REGISTER BLOCK) |
|---|---|---|
| P_CNT | 4 | <P_BLK> |
| P_LVL2 | 1 | <P_BLK>+4h |
| P_LVL3 | 1 | <P_BLK>+5h |

GENERAL-PURPOSE EVENT REGISTERS

| REGISTER | SIZE (BYTES) | ADDRESS (RELATIVE TO REGISTER BLOCK) |
|---|---|---|
| GPE0_STS | GPE0_LEN/2 | <GPE0_BLK> |
| GPE0_EN | GPE0_LEN/2 | <GPE0_BLK>+GPE0_LEN/2 |
| GPE1_STS | GPE1_LEN/2 | <GPE1_BLK> |
| GPE1_EN | GPE1_LEN/2 | <GPE1_BLK>+GPE1_LEN/2 |

| BIT | NAME | DESCRIPTION |
|---|---|---|
| 0 | TMR_STS | THIS IS THE TIMER CARRY STATUS BIT. THIS BIT GETS SET ANYTIME THE 23RD/31ST BIT OF A 24/32-BIT COUNTER CHANGES (WHENEVER THE MSB CHANGES FROM LOW TO HIGH OR HIGH TO LOW. WHILE TMR_EN AND TMR_STS ARE SET, AN INTERRUPT EVENT IS RAISED. |
| 1-3 | RESERVED | RESERVED. |
| 4 | BM_STS | THIS IS THE BUS MASTER STATUS BIT. THIS BIT IS SET ANY TIME A SYSTEM BUS MASTER REQUESTS THE SYSTEM BUS, AND CAN ONLY BE CLEARED BY WRITING A ONE TO THIS BIT POSITION. NOTE THAT THIS BIT REFLECTS BUS MASTER ACTIVITY, NOT CPU ACTIVITY (THIS BIT MONITORS ANY BUS MASTER THAT CAN CAUSE AN INCOHERENT CACHE FOR A PROCESSOR IN THE C3 STATE WHEN THE BUS MASTER PERFORMS A MEMORY TRANSACTION). |
| 5 | GBL_STS | THIS BIT IS SET WHEN A SCI IS GENERATED DUE TO THE BIOS WANTING THE ATTENTION OF THE SCI HANDLER. BIOS WILL HAVE A CONTROL BIT (SOMEWHERE WITHIN ITS ADDRESS SPACE) THAT WILL RAISE AN SCI AND SET THIS BIT. THIS BIT IS SET IN RESPONSE TO THE BIOS RELEASING CONTROL OF THE GLOBAL LOCK AND HAVING SEEN THE PENDING BIT SET. |
| 6-7 | RESERVED | RESERVED. THESE BITS ALWAYS RETURN A VALUE OF ZERO. |
| 8 | PWRBTN_STS | THIS OPTIONAL BIT IS SET WHEN THE POWER BUTTON IS PRESSED. IN THE SYSTEM WORKING STATE, WHILE PWRBTN_EN AND PWRBTN_STS ARE BOTH SET, AN INTERRUPT EVENT IS RAISED. IN THE SLEEPING OR SOFT-OFF STATES A WAKEUP EVENT IS GENERATED WHEN THE POWER BUTTON IS PRESSED (REGARDLESS OF THE PWRBTN_EN BIT SETTING). THIS BIT IS ONLY SET BY HARDWARE AND CAN ONLY BE RESET BY SOFTWARE WRITING A ONE TO THIS BIT POSITION. ACPI DEFINES AN OPTIONAL MECHANISM FOR UNCONDITIONAL TRANSITIONING A CRASHED PLATFORM FROM THE G0 WORKING STATE INTO THE G2 SOFT-OFF STATE CALLED THE POWER BUTTON OVER-RIDE. IF THE POWER BUTTON IS HELD ACTIVE FOR MORE THAN FOUR SECONDS, THIS BIT IS CLEARED BY HARDWARE AND THE SYSTEM TRANSITIONS INTO THE G2/S5 SOFT OFF STATE (UNCONDITIONALLY). SUPPORT FOR THE POWER BUTTON IS INDICATED BY EITHER THE PWR_BUTTON FLAG IN THE FACP TABLE BEING RESET ZERO. IF THE PWR_BUTTON FLAG IS SET HIGH OR A POWER BUTTON DEVICE OBJECT IS PRESENT IN ACPI NAME SPACE, THAN THIS BIT FIELD IS TREATED AS IGNORED BY SOFTWARE. IF THE POWER BUTTON WAS THE CAUSE OF THE WAKEUP (FROM AN S1-S4 STATE), THEN THIS BIT IS SET PRIOR TO RETURNING CONTROL TO THE OS. |
| 9 | SLPBTN_STS | THIS OPTIONAL BIT IS SET WHEN THE SLEEP BUTTON IS PRESSED. IN THE SYSTEM WORKING STATE, WHILE SLPBTN_EN AND SLPBTN_STS ARE BOTH SET, AN INTERRUPT EVENT IS RAISED. IN THE SLEEPING OR SOFT-OFF STATES A WAKEUP EVENT IS GENERATED WHEN THE SLEEPING BUTTON IS PRESSED AND THE SLPBTN_EN BIT IS SET. THIS BIT IS ONLY SET BY HARDWARE AND CAN ONLY BE RESET BY SOFTWARE WRITING A ONE TO THIS BIT POSITION. SUPPORT FOR THE SLEEP BUTTON IS INDICATED BY EITHER THE SLP_BUTTON FLAG IN THE FACP TABLE BEING RESET ZERO. IF THE SLP_BUTTON FLAG IS SET HIGH OR A SLEEP BUTTON DEVICE OBJECT IS PRESENT IN ACPI NAME SPACE, THAN THIS BIT FIELD IS TREATED AS IGNORED BY SOFTWARE. IF THE SLEEP BUTTON WAS THE CAUSE IF THE WAKEUP (FROM AN S1-S4 STATE), THEN THIS BIT IS SET PRIOR TO RETURNING CONTROL TO THE OS. |
| 10 | RTC_STS | THIS OPTIONAL BIT IS SET WHEN THE RTC GENERATES AN ALARM (ASSERTS THE RTC IRQ SIGNAL). ADDITIONALLY, IF THE RTC_EN BIT IS SET THEN THE SETTING OF THE RTC_STS BIT WILL GENERATE A POWER MANAGEMENT EVENT (AN SCI, SMI, OR RESUME EVENT). THIS BIT IS ONLY SET BY HARDWARE AND CAN ONLY BE RESET BY SOFTWARE WRITING A ONE TO THIS BIT POSITION. IF THE RTC WAS THE CAUSE OF THE WAKEUP (FROM AN S1-S3 STATE), THEN THIS BIT IS SET PRIOR TO RETURNING CONTROL TO THE OS. IF THE RTC_S4 FLAG WITHIN THE FACP TABLE IS SET, AND THE RTC WAS THE CAUSE OF THE WAKEUP FROM THE S4 STATE), THEN THIS BIT IS SET PRIOR TO RETURNING CONTROL TO THE OS. |
| 11 | IGNORE | THIS BIT FIELD IS IGNORED BY SOFTWARE. |
| 12-14 | RESERVED | RESERVED. THESE BITS ALWAYS RETURN A VALUE OF ZERO. |
| 15 | WAK_STS | THIS BIT IS SET WHEN THE SYSTEM IS IN THE SLEEPING STATE AND AN ENABLED WAKEUP EVENT OCCURS. UPON SETTING THIS BIT SYSTEM WILL TRANSITION TO THE WORKING STATE. THIS BIT IS SET BY HARDWARE AND CAN ONLY BE CLEARED BY SOFTWARE WRITING A ONE TO THIS BIT POSITION. |

*PRIOR ART*

FIG.4

| BIT | NAME | DESCRIPTION |
|---|---|---|
| 0 | TMR_EN | THIS IS THE TIMER CARRY INTERRUPT ENABLE BIT. WHEN THIS BIT IS SET THEN AN SCI EVENT IS GENERATED ANYTIME THE TMR_STS BIT IS SET. WHEN THIS BIT IS RESET THEN NO INTERRUPT IS GENERATED WHEN THE TMR_STS BIT IS SET. |
| 1-4 | RESERVED | RESERVED. THESE BITS ALWAYS RETURN A VALUE OF ZERO. |
| 5 | GBL_EN | THE GLOBAL ENABLE BIT. WHEN BOTH THE GBL_EN BIT AND THE GBL_STS BIT ARE SET, AN SCI IS RAISED. |
| 6-7 | RESERVED | RESERVED. |
| 8 | PWRBTN_EN | THIS OPTIONAL BIT IS USED TO ENABLE THE SETTING OF THE PWRBTN_STS BIT TO GENERATE A POWER MANAGEMENT EVENT (SCI OR WAKEUP). THE PWRBTN_STS BIT IS SET ANYTIME THE POWER BUTTON IS ASSERTED. THE ENABLE BIT DOES NOT HAVE TO BE SET TO ENABLE THE SETTING OF THE PWRBTN_STS BIT BY THE ASSERTION OF THE POWER BUTTON (SEE DESCRIPTION OF THE POWER BUTTON HARDWARE). SUPPORT FOR THE POWER BUTTON IS INDICATED BY EITHER THE PWR_BUTTON FLAG IN THE FACP TABLE BEING RESET ZERO. IF THE PWR_BUTTON FLAG IS SET HIGH OR A POWER BUTTON DEVICE OBJECT IS PRESENT IN ACPI NAME SPACE, THAN THIS BIT FIELD IS TREATED AS IGNORED BY SOFTWARE. |
| 9 | SLPBTN_EN | THIS OPTIONAL BIT IS USED TO ENABLE THE SETTING OF THE SLPBTN_STS BIT TO GENERATE A POWER MANAGEMENT EVENT (SCI OR WAKEUP). THE SLPBTN_STS BIT IS SET ANYTIME THE SLEEP BUTTON IS ASSERTED. THE ENABLE BIT DOES NOT HAVE TO BE SET TO ENABLE THE SETTING OF THE SLPBTN_STS BIT BY THE ACTIVE ASSERTION OF THE SLEEP BUTTON (SEE DESCRIPTION OF THE SLEEP BUTTON HARDWARE). SUPPORT FOR THE SLEEP BUTTON IS INDICATED BY EITHER THE SLP_BUTTON FLAG IN THE FACP TABLE BEING RESET ZERO. IF THE SLP_BUTTON FLAG IS SET HIGH OR A SLEEP BUTTON DEVICE OBJECT IS PRESENT IN ACPI NAME SPACE, THAN THIS BIT FIELD IS TREATED AS IGNORED BY SOFTWARE. |
| 10 | RTC_EN | THIS OPTIONAL BIT IS USED TO ENABLE THE SETTING OF THE RTC_STS BIT TO GENERATE A WAKEUP EVENT. THE RTC_STS BIT IS SET ANYTIME THE RTC GENERATES AN ALARM. |
| 11-15 | RESERVED | RESERVED. THESE BITS ALWAYS RETURN A VALUE OF ZERO. |

400

*PRIOR ART*

FIG.5

| BIT | NAME | DESCRIPTION |
|---|---|---|
| 0 | SCI_EN | SELECTS THE POWER MANAGEMENT EVENT TO BE EITHER AN SCI OR SMI INTERRUPT FOR THE FOLLOWING EVENTS. WHEN THIS BIT IS SET, THEN POWER MANAGEMENT EVENTS WILL GENERATE AN SCI INTERRUPT. WHEN THIS BIT IS RESET POWER MANAGEMENT EVENTS WILL GENERATE AN SMI INTERRUPT. IT IS THE RESPONSIBILITY OF THE HARDWARE TO SET OR RESET THIS BIT. THE ACPI DRIVER ALWAYS PRESERVES THIS BIT POSITION. |
| 1 | BM_RLD | WHEN SET, THIS BIT ALLOWS THE GENERATION OF A BUS MASTER REQUEST TO CAUSE ANY PROCESSOR IN THE C3 STATE TO TRANSITION TO THE C0 STATE. WHEN THIS BIT IS RESET, THE GENERATION OF A BUS MASTER REQUEST DOES NOT EFFECT ANY PROCESSOR IN THE C3 STATE. |
| 2 | GBL_RLS 510 | THIS WRITE-ONLY BIT IS USED BY THE ACPI SOFTWARE TO RAISE AN EVENT TO THE BIOS SOFTWARE, THAT IS, GENERATES AN SMI TO PASS EXECUTION CONTROL TO THE BIOS FOR IA-PC PLATFORMS. BIOS SOFTWARE HAS A CORRESPONDING ENABLE AND STATUS BIT TO CONTROL ITS ABILITY TO RECEIVE ACPI EVENTS (FOR EXAMPLE, BIOS_EN AND BIOS_STS). THE GBL_RLS BIT IS SET BY THE ACPI DRIVER TO INDICATE A RELEASE OF THE GLOBAL LOCK AND THE SETTING OF THE PENDING BIT IN THE FACS MEMORY STRUCTURE. |
| 3-8 | RESERVED | RESERVED. THESE BITS ARE RESERVED BY THE ACPI DRIVER. |
| 9 | IGNORE | SOFTWARE IGNORES THIS BIT FIELD. |
| 10-12 | SLP_TYPx | DEFINES THE TYPE OF SLEEPING STATE THE SYSTEM ENTERS WHEN THE SLP_EN BIT IS SET TO ONE. THIS 3-BIT FIELD DEFINES THE TYPE OF HARDWARE SLEEP STATE THE SYSTEM ENTERS WHEN THE SLP_EN BIT IS SET. THE \_Sx OBJECT CONTAINS 3-BIT BINARY VALUES ASSOCIATED WITH THE RESPECTIVE SLEEPING STATE (AS DESCRIBED BY THE OBJECT). THE ACPI DRIVER TAKES THE TWO VALUES FROM THE \_Sx OBJECT AND PROGRAMS EACH VALUE INTO THE RESPECTIVE SLP_TYPx FIELD. |
| 13 | SLP_EN | THIS IS A WRITE-ONLY BIT AND READS TO IT ALWAYS RETURN A ZERO. SETTING THIS BIT CAUSES THE SYSTEM TO SEQUENCE INTO THE SLEEPING STATE ASSOCIATED WITH THE SLP_TYPx FIELDS PROGRAMMED WITH THE VALUES FROM THE \_Sx OBJECT. |
| 14-15 | RESERVED | RESERVED. THIS FIELD ALWAYS RETURNS ZERO. |

500

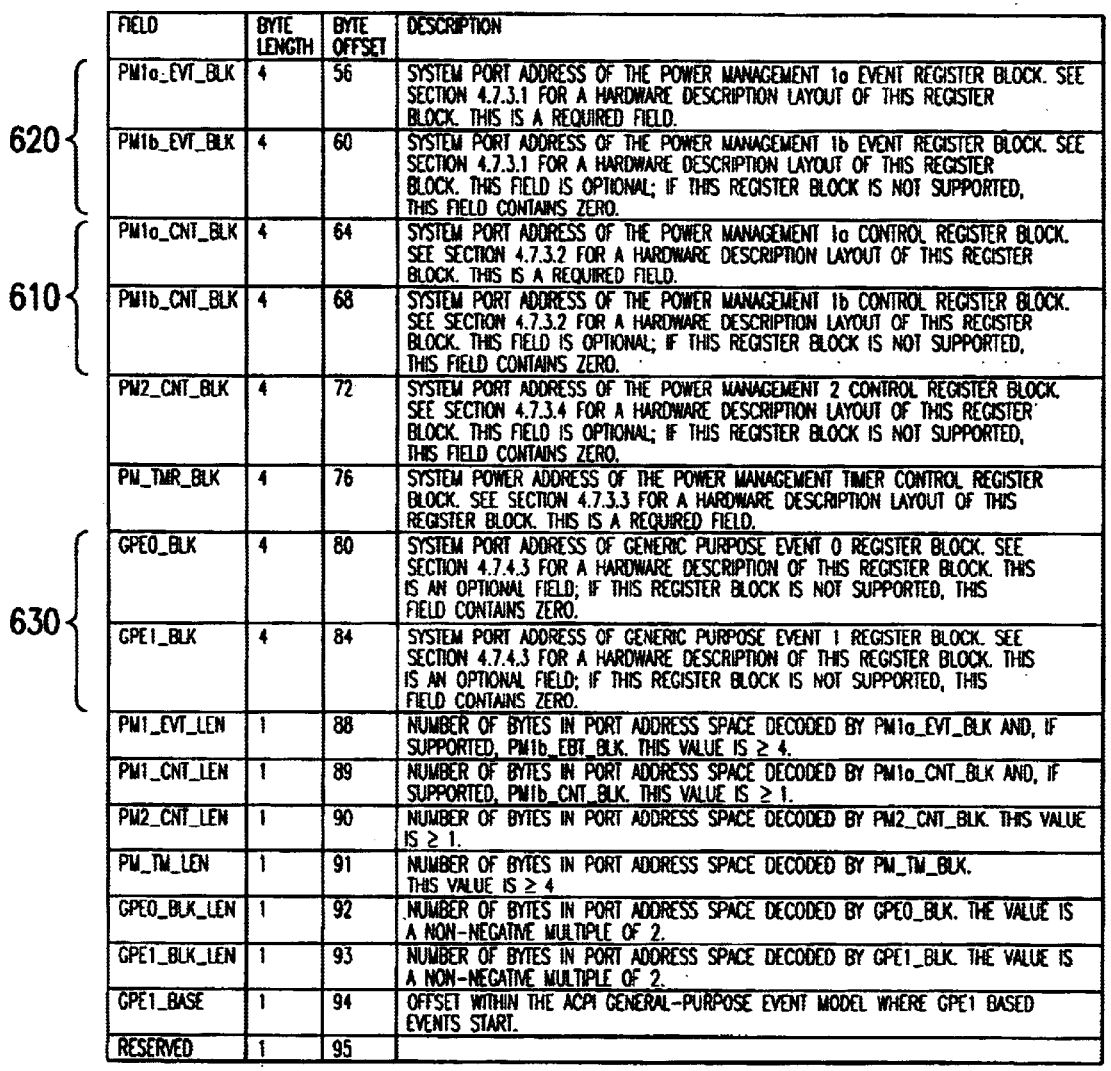
FIG.6 *PRIOR ART*

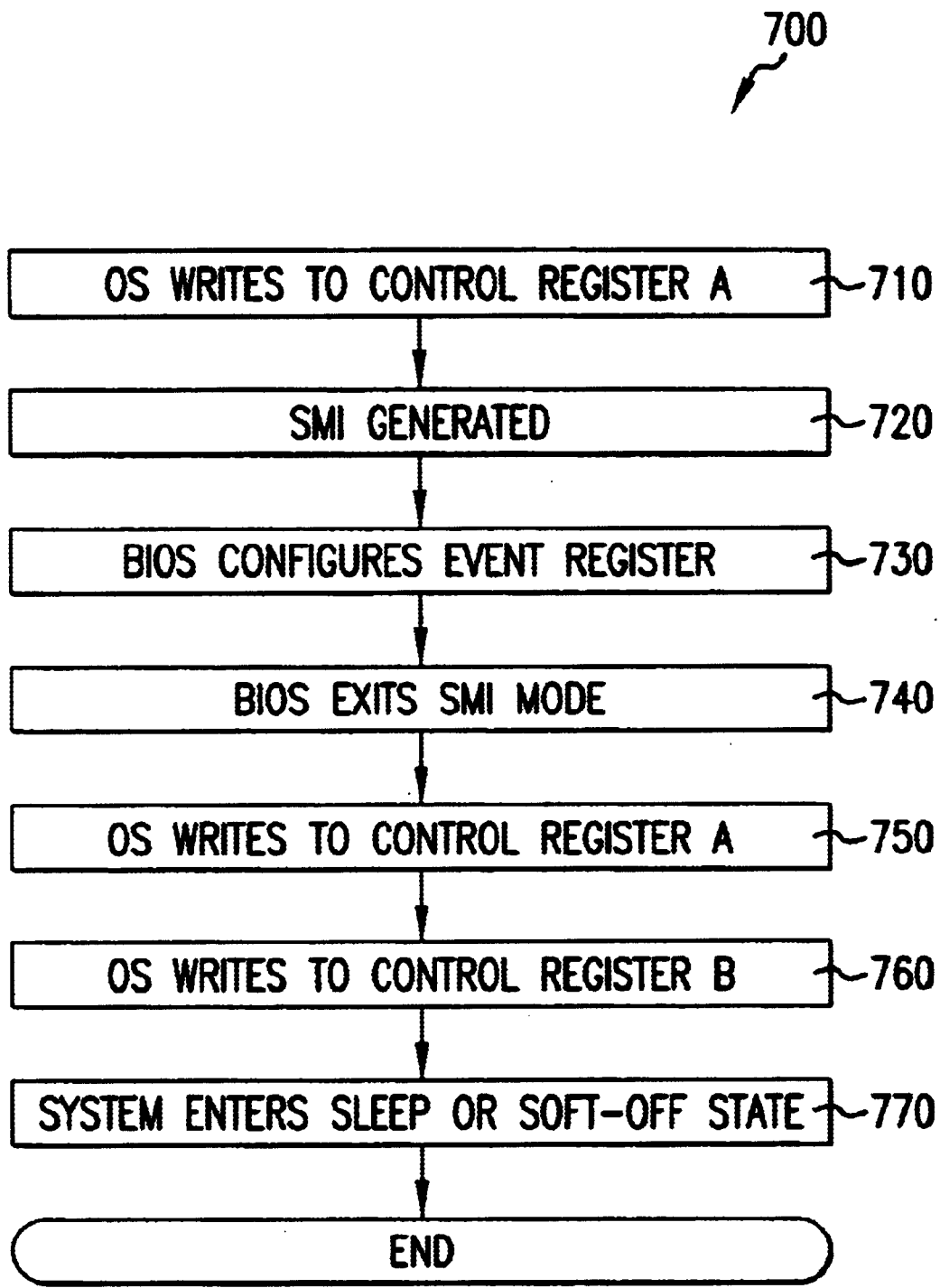
PRIOR ART FIG.7

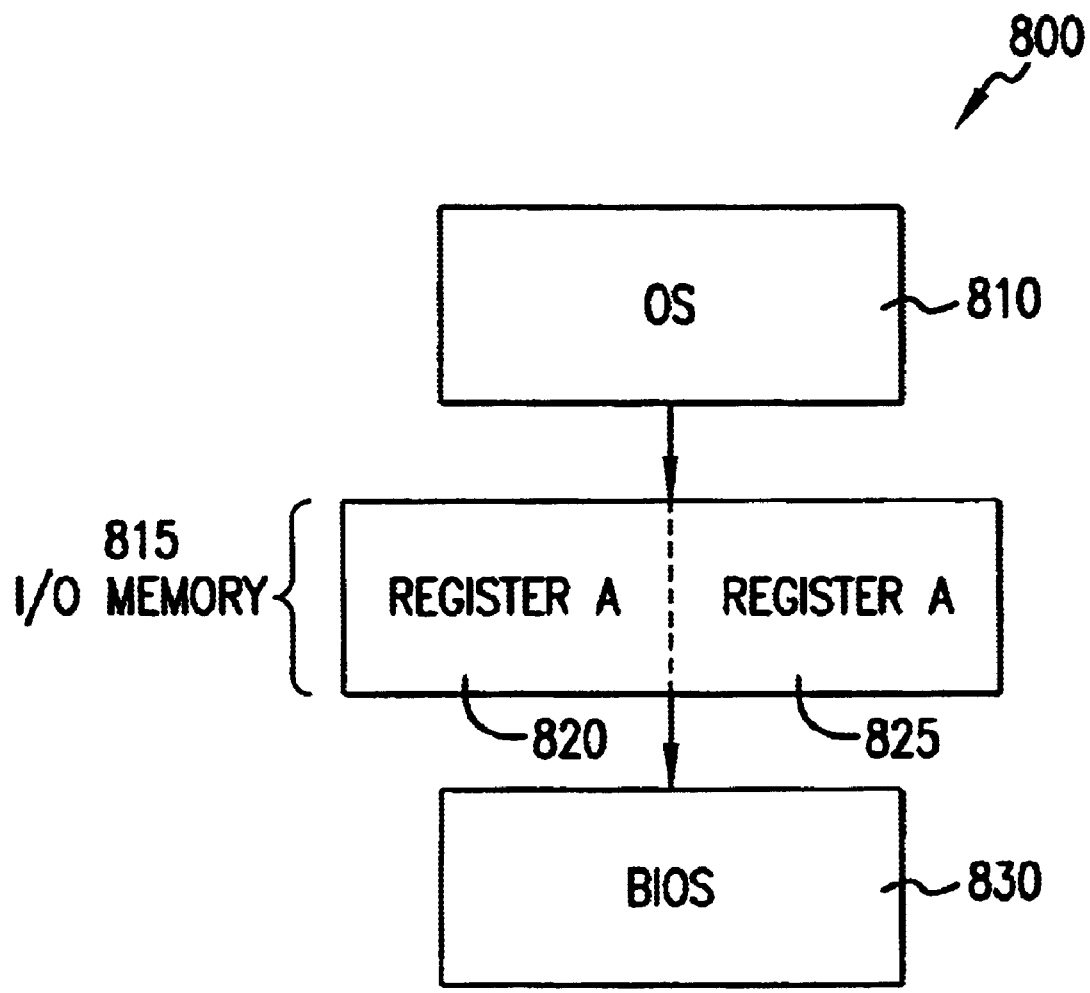
PRIOR ART  FIG.8

METHOD AND APPARATUS FOR ENABLING A WAKE-UP EVENT BY MODIFYING A SECOND REGISTER TO ENABLE A SECOND WAKE-UP EVENT RESPONSIVE TO DETECTING ENTRY OF DATA IN A FIRST REGISTER

BACKGROUND OF THE INVENTION

1. Field of the Invention

The present invention relates generally to computer system management. It particularly relates to a method and apparatus for configuring wake-up events independent of a computer operating system that is running an advanced configuration and power interface protocol.

2. Background Art

Most computer system power management techniques, such as the advanced power management system (APM), are implemented using the basic input-output system (BIOS) instructions stored in read-only memory (ROM). In an exemplary scenario, a wake-up event (e.g., transitioning from an "off" or "sleep" state to an "on" state) triggers a system management interrupt (SMI) notifying the BIOS of the event. The BIOS then performs all state restoration actions needed before relinquishing control over to the operating system (OS) to complete the system wake-up.

Under the newer ACPI (advanced configuration and power interface), a wake-up event triggers a system control interrupt (SCI) that notifies the OS, and the OS itself directs all system and device power state transitions. An exemplary ACPI-compliant OS is the Windows 98 operating system. The ACPI specification, version 1.0b, published by Intel Corporation, Microsoft Corporation, and Toshiba K.K. in February 1999, includes tables, BIOS, and hardware registers. ACPI tables are used to describe system information (e.g., supported power states, power sources, clock sources), features (e.g., available hardware devices), and methods for controlling those features (e.g., ACPI control methods). Particularly, a fixed ACPI (FACP) table holds the I/O addresses used by the OS to describe the different hardware devices for power management events. The ACPI BIOS, part of the computer system firmware, implements the ACPI specified interfaces for sleep, wake, and some restart operations. It also provides permanent storage of ACPI table information. ACPI registers are used to store and pass event information between the hardware/firmware and an ACPI driver, an OS level program that directs all transitions between working and sleeping states.

Typically, enabling of wake-up events from an ACPI sleeping state (S1–S4) is controlled by the OS. However, the ACPI specification only allows for a power button (e.g., connected through hardware) wake-up event from a S5 soft-off state (not a sleep state) as indicated in the ACPI register. Thus, additional wake-up events from the S5 state can be configured only through additional hardware which can be costly and inflexible. Therefore, there is a need to enable new wake-up events from the S5 state, recognizable by an ACPI-compliant OS, using existing hardware which facilitates remote computer management.

BRIEF DESCRIPTION OF THE DRAWINGS

FIG. 2 shows the ACPI registers in accordance with an embodiment of the present invention.

FIG. 3 shows the control bit descriptions for the ACPI event registers in accordance with an embodiment of the present invention.

FIG. 4 shows additional control bit descriptions for the ACPI event registers in accordance with an embodiment of the present invention.

FIG. 5 shows the control bit description for the ACPI control registers in accordance with an embodiment of the present invention.

FIG. 6 shows the Fixed ACPI tables in accordance with an embodiment of the present invention.

FIG. 7 shows flow diagram for enabling an additional wake-up event in accordance with embodiments of the present invention.

FIG. 8 shows a block diagram of a representative computer system in accordance with an embodiment of the present invention.

DETAILED DESCRIPTION

Figure 1:
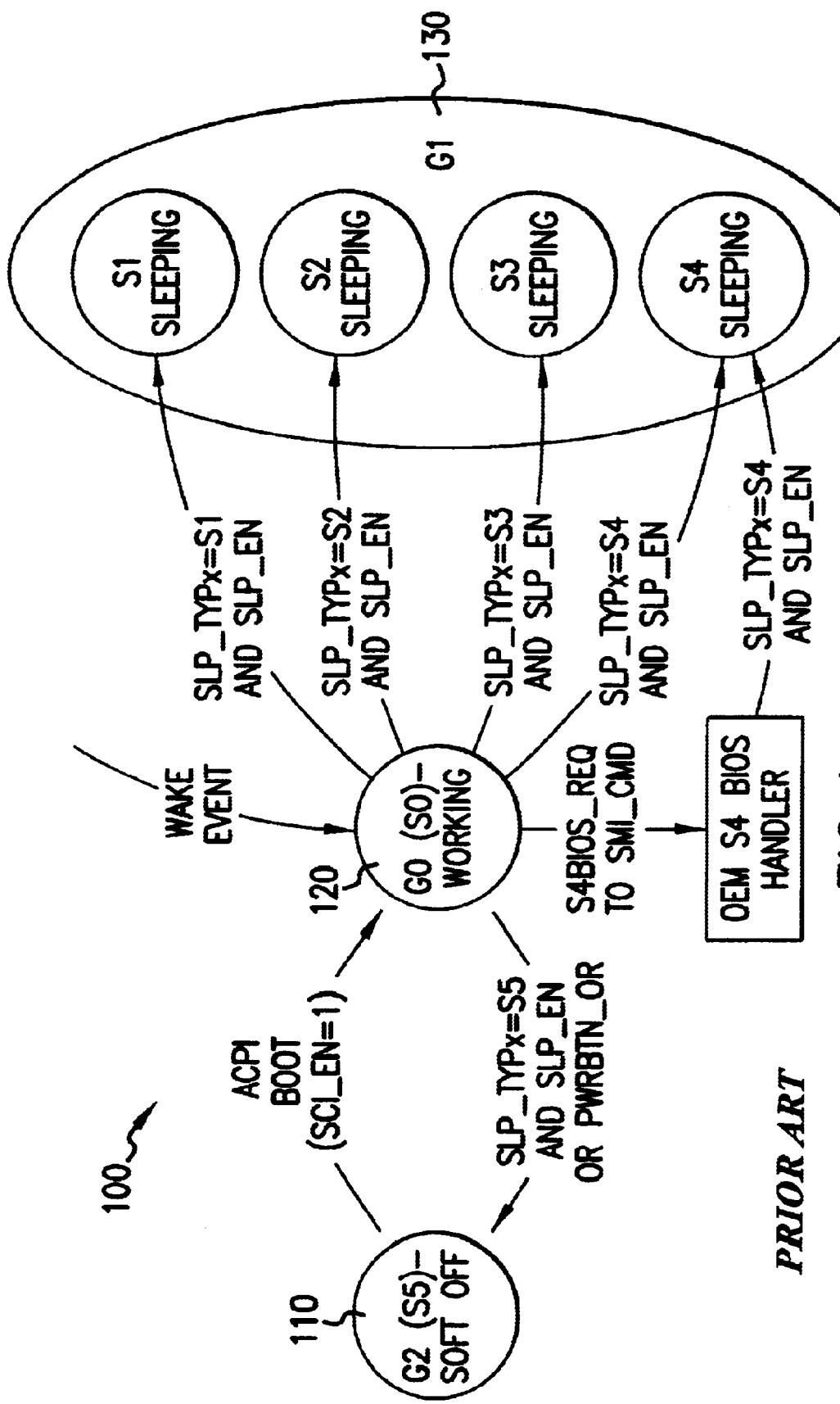
FIG. 1 shows the ACPI sleep-to-wake transitions in accordance with an embodiment of the present invention.

FIG. 1 illustrates the ACPI sleep-to-wake transitions 100 for a computer system in accordance with an embodiment of the present invention. Generally, there exists three different system states (G2) 110, (G0) 120, (G1) 130 for an ACPI-compliant computer system. In the G0 state 120, work is being performed by the operating system (OS) or computer hardware which may be in any of the ACPI defined power states. In the G1 state 130, the system is assumed to be doing no work as the sleeping states (S1–S4) are entered for the hardware devices. As illustrated in FIG. 1, the OS may program, as directed by an ACPI driver, the sleep type field (SLP_TYPx) and sets the sleep enable bit (SLP_EN) to start the sleeping sequence for each sleeping state.

Prior to entering the G1 state, the OS may also execute, as directed by the ACPI driver, a Prepare to Sleep (_PTS) control method (for S1–S4 states) which provides the BIOS a mechanism for performing some system operations before entering the sleeping state. The _PTS control method may be an OEM-specific ACPI Machine Language (AML)/ACPI Source Language (ASL) code executed by the ACPI driver. The _PTS control method may be executed prior to entering the sleeping state and is not synchronized with a write to the control register (PM1_CNT) which is the control register for fixed features (e.g., hardware devices). The PM1 control register has a set of bits that can be distributed between two different registers (PM1$a$, PM1$b$) allowing these registers to be partitioned between two chips, or all placed on a single chip.

A wake-up event must be enabled before the sleeping state is entered. The OS enables the wake-up feature on particular devices by setting that device's enable bit which is located in the device's entry in the Fixed ACPI (FACP) description table. In AtCPI, each control register has a 32-bit pointer in the FACP. Similarly, ACPI includes PM1 event registers (PM1$a$_EVT_BLK, PM1$b$_EVT_BLK) wherein each event register has a 32-bit pointer in the FACP table. Also, ACPI includes general-purpose event registers (GPE0_BLK, GPE1_BLK) that contain the root level events for all generic features, each general register block containing a pointer in the FACP table. For all sleeping states (S1–S4), system context is saved to memory. Particularly, for sleeping state S4, system context is advantageously saved to a back-up media, an example being a hard disk drive.

For the G2 state 110 (soft-off S5 state), the OS turns the computer off. S5 is not a sleeping state as no system context is saved by the OS or the hardware. The S4 state, the lowest power sleeping state, has either a BIOS-initiated transition or an OS-initiated transition to the sleeping state, dependent on the OS and FACP table entries. The BIOS-initiated transition is identical in terms of hardware actions (e.g., BIOS control) to the S5 state except that system context is saved to memory for the S4 state. The computer system in the S5 state requires a complete boot to awaken and the ACPI specifications allows only a power button as an enabled wake-up event. Exemplary embodiments of the present invention may advantageously support the OS-initiated S4 sleeping state.

In accordance with embodiments of the present invention, BIOS control is used to advantageously provide at least one additional wake-up event to be enabled for the computer system. Advantageously, the additional wake-up event may be a remote access attempt allowing remote computer management.

As shown in FIG. 2, ACPI has a plurality of register blocks 200 including event register blocks 210 (PM1$a$_EVT_BLK, PM1$b$_EVT_BLK), control register blocks (PM1$a$_CNT_BLK, PM1$b$_CNT_BLK) 220, and general-purpose event register blocks (GPE0_BLK, GPE1_BLK) 230 that are used for power management events, and other registers 240. FIGS. 3 and 4 provide a table description 300, 400 of the bits contained in the PM1 event register. FIG. 5 provides a table description 500 of the bits contained in the PM1 control register The first control register (PM1$a$_CNT) is required while the other (PM1$b$_CNT) is optional. Similarly, the first event register block (PM1$a$_EVT) is required while the other (PM1$b$_EVT) is optional. In common practice, only the PM1$a$ control register is functional while the PM1$b$ register contains a value of zero in the FACP table. FIG. 6 shows the register block entries 600 for the control register 610, event register 620, and general-purpose register 630 in the FACP table. In accordance with embodiments of the present invention, the event register block or the general-purpose event register block may be used to enable additional wake-up events without using additional hardware making this configuration transparent (independent) to the OS.

In normal ACPI operation, prior to entering a sleeping state (G1), the OS writes to the PM1$a$ control register by programming the SLP_TYPa (sleep type) field and then writing to the PM1$b$ control register by programming the SLP_TYPb (sleep type) field. Then, the OS sets the sleep enable bit for each register (SLP_ENa, SLP_ENb). Also, the enable bit for enabling system wake-up is set for the device entry in the FACP table. Finally, the system enters the specified sleeping state. The OS performs similar actions when entering the S5 state (soft-off state), but only the power button is enabled for system wake-up during this normal operation.

In accordance with embodiments of the present invention, the PM1 event register, the general-purpose event register, or both may be modified after the OS writes to the PM1$a$ control register, but before the system enters any of the sleeping states or soft-off state to enable additional wake-up events. As illustrated in FIG. 7, embodiments of the present invention advantageously follow process 700 to enable additional wake-up events. At 710, the OS begins the working-to-sleep transition by writing to the PM1$a$ control register which includes programming the 3-bit sleep type field (SLP_TYP). At 720, a system management interrupt (SMI) is generated from this write procedure via the GBL_RLS feature control bit 510 in the control register (see FIG. 5). At 730, from the SMI, the BIOS is enabled to modify (configure) the PM1 event register (PM1$a$_EVT or PM1$b$_EVT), the GPE event register (GPE0_BLK or GPE1_BLK), or both. By following this process, the PM1$a$ control register may be advantageously configured (used) as a hardware control register, enabling BIOS, via the SMI, to configure additional wake-up events via modification of the event registers. Advantageously, existing hardware uses the OS to generate an I/O trap, via the SMI, allowing BIOS to enable additional wake-up events by modifying the event registers, an exemplary additional wake-up event being a remote access attempt. At 740, BIOS exits the SMI mode which returns control to the OS. The OS continues the normal working-to-sleep transition by writing to the PM1$b$ control register which includes programming the sleep type field (SLP_TYP). At 750, the OS writes to the PM1$a$ control register with the sleep enable bit (SLP_EN). An SMI is generated from this write procedure enabling BIOS, which then returns control back to the OS. At 760, the OS writes to the PM1$b$ control register with the sleep enable bit (SLP_EN). Finally, at 770, the system enters the specified sleeping state (S1–S4) or soft-off state (S5). Advantageously, embodiments of the present invention may be implemented in any section of the computer system (e.g., power management section) with access to hardware that enables control to pass over to the BIOS. In accordance with embodiments of the present invention, this process may be used to enable particular wake-up events that may be customized dependent on the specific needs of the computer system.

Although preferably used for enabling additional wake-up events, the configured hardware control register (e.g., PM1 control register) can be advantageously used for other functions. These other functions include, but are not limited to design-around solutions to hardware/OS errors, debugging code for operations performed before or after working-to-sleep transition, and other functions. Generally, embodiments of the present invention may be use to advantageously modify any system operation that is performed before or after going to the sleeping or the soft-off state. To perform fixing operations upon waking, the values indicating the fixing operations may be preserved in volatile or non-volatile memory by the BIOS.

FIG. 8 shows a representative computer system 800 in accordance with embodiments of the present invention. The components of the system 800 advantageously include OS 810, I/O memory 815 which includes register block A 820 and register block B 825, and BIOS circuit 830 which may be included in the system ROM. Each register block 820, 825 may advantageously include PM1 control registers, PM1 event registers, and GPE event registers and each register block 820, 825 may have an entry in a device table (not shown). OS 810 is operatively coupled to I/O memory 815 which is operatively coupled to BIOS circuit 830. In operation, after the OS writes to a control register included within register block A 820, an SMI is generated which enables the BIOS circuit 830 to modify an event register (e.g., PM1 and/or GPE) included within register block A or B (820, 825) to enable additional wake-up events. Remote access attempts are solely described herein as an exemplary additional wake-up event, and any plurality of additional wake-up events may be enabled by the BIOS. These additional wake-up events include, but are not limited to, modem event, CD-ROM event, keyboard event, and other wake-up events including other peripherals.

Additionally, embodiments of the present invention may include a computer-readable medium having stored thereon instructions adapted to be executed by a circuit, the instructions which, when executed, cause the circuit to perform the method described herein to enable additional wake-up events for a computer system.

Although the invention is described herein using an ACPI system example, it will be appreciated by those skilled in the art that modifications and changes may be made without departing from the spirit and scope of the present invention. As such, the method and apparatus described herein may be equally applied to any computer system power management technique that enables new wake-up events independent of the computer operating system.

What is claimed is:

1. A method for allowing a computer to wakeup, comprising:

detecting entry of data into a first register to enter a non-working state enabling a first wake-up event for a computer;

modifying data in a second register in response to a system management interrupt being generated, and using basic input-output system instructions to place data into the second register to enable a second wake-up event from said non-working state in response to said detecting entry of data into the first register, wherein the second resister includes a pointer in a device table; and allowing entry into said non-working state for the computer.

2. The method of claim 1, wherein said non-working state is entered via entry of data into a third register, related to said first register.

3. The method of claim 1, wherein said first wake-up event is either a power button or advanced configuration and power interface-enabled signal, and wherein said second wake-up event is a remote access attempt.

4. The method of claim 1, wherein said non-working state is the S5 soft-off state of an advanced configuration and power interface operating system.

5. The method of claim 1, wherein said device table is a fixed advanced configuration and power interface table.

6. An article of manufacture comprising a computer-readable medium having stored thereon instructions adapted to be executed by a circuit, the instructions which, when executed, cause the circuit to:

detect entry of data into a first register enter a non-working state enabling a first wake-up event for a computer;

modify data in a second register in response to a system interrupt and use basic input-output system instructions to enter data into the second register to enable a second wake-up event from said non-working state in response to the detection of entry of data into the first register, wherein the second register has a pointer in a device table; and allow entry into said non-working state for the computer.

7. The article of manufacture of claim 6, wherein said non-working state is entered via entry of data into a third register, related to said first register.

8. The article of manufacture of claim 6, wherein said first wake-up event is either a power button or advanced configuration and power interface-enable signal and said second wake-up event is a remote access attempt.

9. The article of manufacture of claim 6, wherein said non-working state is the S5 soft-off state of an advanced configuration and power interface operating system.

10. The article of manufacture of claim 7, wherein said device table is a fixed advanced configuration and power interface table.

11. A computer system, comprising:

a plurality of registers to store data for wake-up events for a computer from a nonworking state, each having a pointer to a device table;

an I/O memory, including said plurality of registers, to store I/O addresses for hardware enabled to wake-up the computer from the non-working state;

a processor, operatively coupled to said memory, for entering data in a first portion of said plurality of registers and reading the I/O addresses to enable a first wake-up event, and for placing the computer in the non-working state;

a basic input-output system instruction circuit, operatively coupled to at least a second portion of said plurality of registers, to modify the data in said second portion, to enable a second wake-up event, in response to a system management interrupt generated by said processor.

12. The system of claim 11, wherein said non-working state is entered via entry of data into a third portion, related to said first portion, of said plurality of registers by said processor.

13. The system of claim 11, wherein said first wake-up event is either a power button or advanced configuration and power interface-enabled signal and said second wake-up event is a remote access attempt.

14. The system of claim 11, wherein said non-working state is the S5 soft-off state of an advanced configuration and power interface operating system.

15. The system of claim 11, wherein said device table is a fixed advanced configuration and power interface table.

* * * * *

UNITED STATES PATENT AND TRADEMARK OFFICE
CERTIFICATE OF CORRECTION

PATENT NO.     : 6,725,384 B1
DATED          : April 20, 2004
INVENTOR(S)    : John P. Lambino and James H. Ewertz It is certified that error appears in the above-identified patent and that said Letters Patent is hereby corrected as shown below:

Column 5,
Line 13, "a computer to wakeup" should be -- a computer to wake up --
Line 25, "The second resister" should be -- the second register --
Lines 46-47, there should be no return after "wake-up"

Column 6,
Line 25, "enabled to wake-up" should be -- enabled to wake up --

Signed and Sealed this

Twenty-eighth Day of December, 2004

JON W. DUDAS
*Director of the United States Patent and Trademark Office*